A. GOWDER & L. O. BRAND.
CLUTCH PEDAL REGULATING DEVICE.
APPLICATION FILED MAR. 8, 1916.
1,190,995.
Patented July 11, 1916.
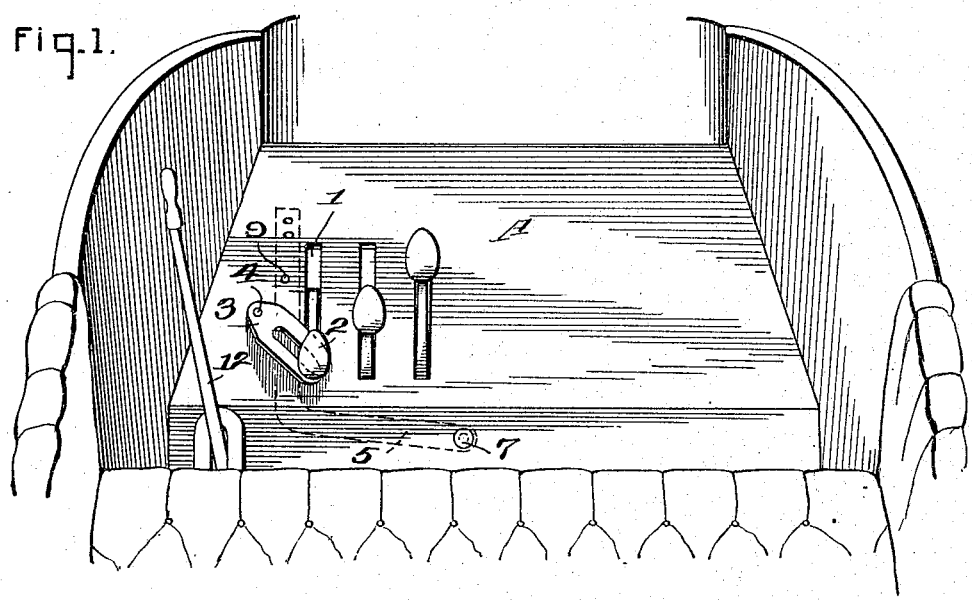
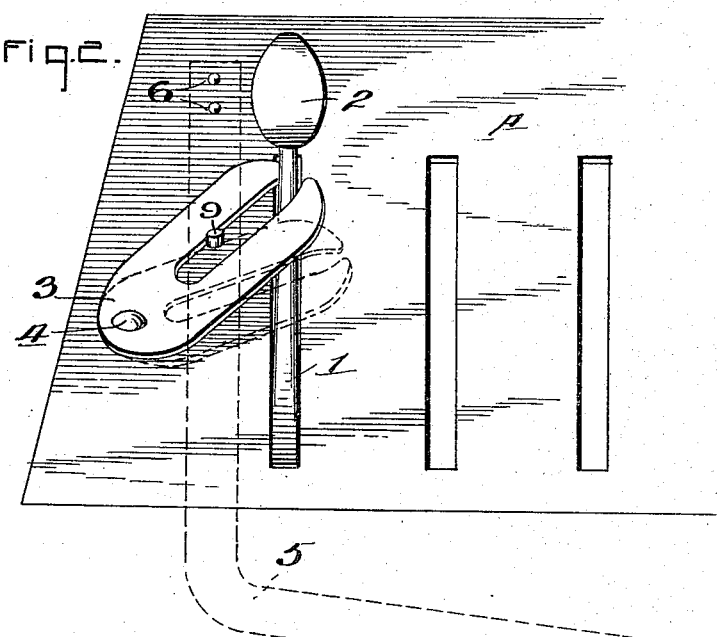
Inventors
Arthur Gowder
and Lamont O. Brand
By Lewis Bogges & Co
their Attorneys

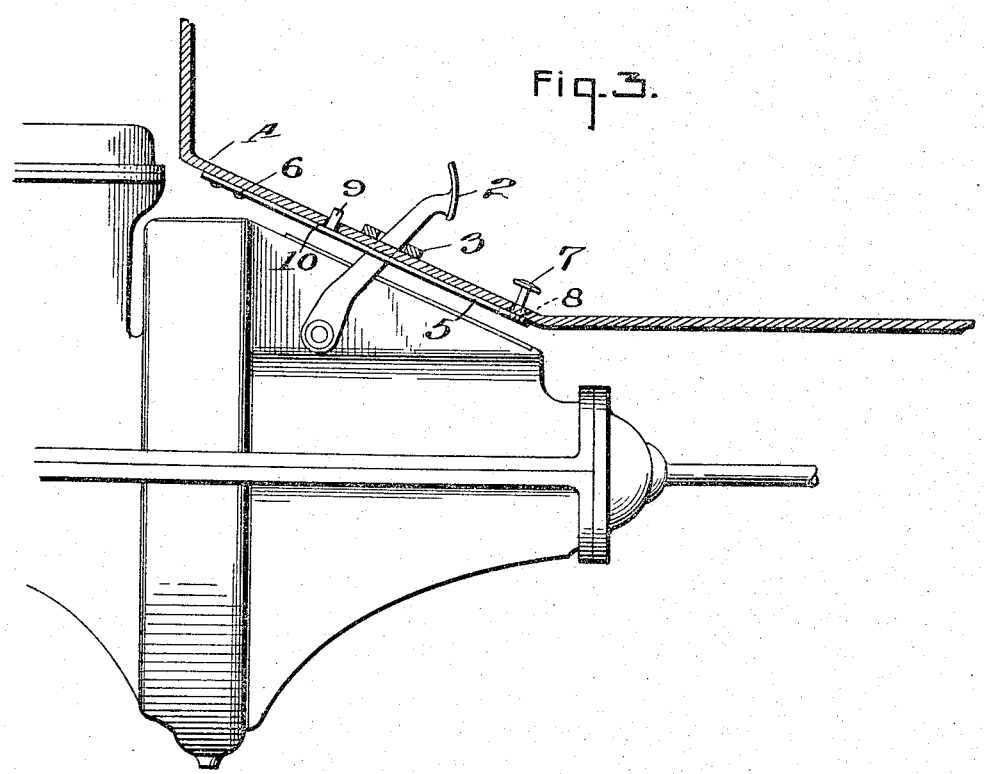
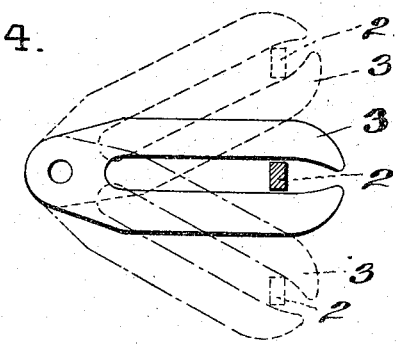

UNITED STATES PATENT OFFICE.

ARTHUR GOWDER AND LAMONT O. BRAND, OF RIVERSIDE, CALIFORNIA.

CLUTCH-PEDAL-REGULATING DEVICE.

1,190,995.  Specification of Letters Patent.  Patented July 11, 1916.

Application filed March 8, 1916. Serial No. 82,968.

*To all whom it may concern:*

Be it known that we, ARTHUR GOWDER and LAMONT O. BRAND, citizens of the United States, residing at Riverside, in the county of Riverside and State of California, have invented certain new and useful Improvements in Clutch-Pedal-Regulating Devices, of which the following is a specification.

Our invention relates to improvements in clutch pedal regulating devices, and is applied more particularly to that type of car commonly called the Ford.

In the Ford type of transmission one pedal, hereafter called the clutch pedal controls the forward speeds and a second pedal the reversing mechanism. When the clutch pedal is forced forward to its full extent, the low speed is thrown in and upon the releasing of the clutch pedal, it is automatically returned to its normal position where it is in high gear. A neutral position is provided between high and low, but it is not marked by any definite place where the clutch pedal can be considered as not engaging either a high or low gear.

It is an object of our invention to provide such a device whereby a person driving a car will be enabled to push the clutch to neutral without any fear of pushing it too far forward and thus into low.

A further object of our invention is to provide means for permitting the clutch to be in forward or low position without a constant pressure from the driver's foot.

A further object of our invention is to permit of stopping the clutch pedal in an exact neutral position without having to resort to the use of the hand brake.

In the accompanying drawings: Figure 1 is a perspective view of the floor of a car showing our invention in place: Fig. 2 is a vertical cross section: Fig. 3 is a view from beneath showing the relation of the parts: and Fig. 4 is a detail.

A, represents the floor of the car and the numeral 1 is the slot in which the clutch pedal 2, controlling the high and low speeds, moves.

It will be understood that when the clutch pedal 2 is in the forward position, the car is in low gear, and when at the opposite end of the slot the car is in high gear. A bifurcated cam member 3 is pivoted at 4 and adapted to engage the shank of the pedal 2, and to move with it as the clutch is moved. To the floor of the car is fastened a spring member 5, which is rigidly secured at 6. At the free end of the spring 5 is affixed the safety pedal 7, which is slidably received in an orifice 8 in the floor of the car.

At about the center of the spring 5 is welded a projection 9, which protrudes through the floor at 10 to act as a cam catch for the cam 3. This projection 9 is normally raised above the level of the floor, so that upon pushing the clutch pedal forward the cam 3 will engage the projection 9 and prevent the pedal moving forward any farther. This projection 9 is so placed as to stop the clutch at exactly neutral. When it is desired to push the clutch into low gear the safety pedal 7 is pressed down, pressing in turn on spring 5, lowering the projection 9 below the level of the floor, so that upon the pushing forward of the pedal 2 and cam 3, there will be nothing to prevent the car from entering the second speed. The bifurcated cam 3 is so made that the ends of the bifurcated portion converge so that when the clutch pedal is pushed to its farthest position, it is engaged on both sides by the two prongs of the cam, as may be seen in dotted lines in Fig. 4. For this reason, when the clutch pedal 2 has been pushed to its farthest position upon the release of the pedal 7, the projection 9 will be raised and will engage an edge of a prong of the cam 3, thus holding the clutch pedal 2 in its extreme forward position until the release of the cam 3 by pushing down upon the pedal 7.

The usual pedal returning means is provided as in all clutch pedals. At 12 is disclosed the customary hand lever, which is adapted to hold the clutch in neutral when the hand brake is applied.

We claim:

1. In a pedal regulating device, the combination with a foot pedal, of a cam member in engagement therewith and adapted to be positively actuated at all times by the movement of said foot pedal, and means for limiting the movement of said cam member.

2. In a pedal regulating device the combination with a clutch pedal, of a cam member in engagement therewith, resilient means, a projection mounted thereon, means for actuating said resilient means, whereby the projection will engage said cam member for limiting its movement.

3. In a pedal regulating device the combination with a clutch pedal, of a bifurcated cam member in engagement therewith, so made as to constrict about said clutch pedal when it is moved to its extreme position, and stopping means in the path of the cam member to limit its movement.

4. In a pedal regulating device the combination with a floor, of a clutch pedal, of a pivoted and bifurcated cam member in engagement therewith and adapted to constrict about said clutch member when it is moved to its extreme positions, resilient means fastened to said floor, a projection, said projection adapted normally to be above the surface of said floor and in the path of said cam member, and means for actuating the free end of said resilient means, said projection adapted to limit the movement of said cam member.

5. In a pedal regulating device the combination with a floor, of a clutch pedal, of a pivoted bifurcated cam member in engagement therewith, a projection, and means for operating the same, said projection being normally in the path of the cam member and adapted to engage one edge of said cam member, but so made as to permit the passing of the clutch pedal to the forward position, whereby the projection may be raised to engage another edge of said cam member for limiting its movement.

6. In a pedal regulating device, the combination with a foot pedal, of a cam member in engagement and adapted to travel therewith, and to be positively actuated in the direction of movement of the foot pedal, and means for limiting the movement of said cam member.

7. In a pedal regulating device, the combination with a foot pedal, of a cam member pivoted in close proximity to said foot pedal, so located as to be positively impelled by the foot pedal in whatever direction it moves, and means for limiting the oscillation of said cam member.

In testimony whereof we affix our signatures.

ARTHUR GOWDER.
LAMONT O. BRAND.

Copies of this patent may be obtained for five cents each, by addressing the "Commissioner of Patents, Washington, D. C."